US006871724B2

(12) United States Patent
Hachiya et al.

(10) Patent No.: US 6,871,724 B2
(45) Date of Patent: Mar. 29, 2005

(54) ELECTROACOUSTIC TRANSDUCER FRAME AND METHOD OF MAKING THE SAME

(75) Inventors: Satoshi Hachiya, Tendo (JP); Masatoshi Sato, Tendo (JP); Kazuhiko Saheki, Himeji (JP); Shigeyuki Kousaka, Himeji (JP); Moriyuki Yokoyama, Nishinomiya (JP)

(73) Assignees: Pioneer Corporation, Tokyo (JP); Tohoku Pioneer Corporation, Yamagata-ken (JP)

( * ) Notice: Subject to any disclaimer, the term of this patent is extended or adjusted under 35 U.S.C. 154(b) by 0 days.

(21) Appl. No.: 10/197,588

(22) Filed: Jul. 18, 2002

(65) Prior Publication Data

US 2003/0024763 A1 Feb. 6, 2003

(30) Foreign Application Priority Data

Jul. 23, 2001 (JP) ...................................... 2001-221194

(51) Int. Cl.$^{7}$ ................................................ G01K 13/00
(52) U.S. Cl. ....................................................... 181/169
(58) Field of Search ......................... 181/169, 165–168, 181/170, 171, 172, 173, 174, 163, 164

(56) References Cited

U.S. PATENT DOCUMENTS 4,359,132 A * 11/1982 Parker et al. ............... 181/169
4,753,969 A * 6/1988 Mizone et al. .............. 523/211
4,928,312 A * 5/1990 Hill ............................ 381/424
5,740,264 A * 4/1998 Kojima ....................... 381/423
5,830,940 A * 11/1998 Nakamura et al. .......... 524/404

FOREIGN PATENT DOCUMENTS

| | | |
|---|---|---|
| JP | 06-169498 | 6/1994 |
| JP | 08-340594 | 12/1996 |
| JP | 09-084183 | 3/1997 |
| JP | 09-093692 | 4/1997 |
| JP | 11-275687 | 10/1999 |

* cited by examiner

*Primary Examiner*—Kimberly Lockett
(74) *Attorney, Agent, or Firm*—Finnegan, Henderson, Farabow, Garrett & Dunner, L.L.P.

(57) ABSTRACT

A frame of an electroacoustic transducer is made from a mixture of a thermoplastic resin and long fibers dispersed in the resin. The long fibers serve as reinforcing fibers. The long fibers have an average length sufficient to achieve a spring back effect. The spring back effect creases a foam structure. The electroacoustic transducer frame includes single-layer portions and three-layer portions. The single-layer portion is made of a non-foam layer. The three-layer portion is made of a pair of non-foam layers and a foam layer sandwiched by the non-foam layers. The electroacoustic transducer frame is lightweight, and has high internal loss, high rigidity and improved environmental resistance.

20 Claims, 9 Drawing Sheets

ELECTROACOUSTIC TRANSDUCER FRAME AND METHOD OF MAKING THE SAME

BACKGROUND OF THE INVENTION

1. Field of the Invention

The present invention relates to a frame of an electroacoustic transducer such as a speaker, and also relates to a method of making such frame.

2. Description of the Related Art

Referring to FIG. 1 of the accompanying drawings, a conventional electrokinetic speaker is illustrated in a cross sectional view. This speaker is an example of electroacoustic transducers. The electrokinetic speaker includes a pole yoke 1 which projects from a center of a back plate. A magnet 2 is placed around the pole yoke 1. A top plate 3 is located on the magnet 2 such that a magnetic gap is formed between the pole yoke 1 and the top plate 3. Accordingly, a magnetic circuit is defined in the speaker. The top plate 3 is firmly secured to the frame 5. A voice coil bobbin is oscillatably located in the magnetic gap. A voice coil 4 is wound around the voice coil bobbin. The voice coil bobbin is supported by a damper 7. A truncated cone-shaped diaphragm 8 is attached to the voice coil bobbin at its center. The diaphragm 8 has a center cap 6 to close the truncated portion. An outer periphery of the diaphragm 8 has an edge 9, which is supported by the frame 5. A lead of the voice coil is connected to a terminal attached to a lateral face of the frame 5 via a cord.

The speaker frame 5 supports the diaphragm 8 and the magnetic circuit such that relative positional relationship between the diaphragm 8 and magnetic circuit is maintained. A periphery of a front portion of the frame 5 is fixed to a baffle plate or a cabinet. In this manner, the frame 5 serves as a fundamental structural member of the speaker system. The electroacoustic transducer frame 5 has to have rigidity and creep resistance. In particular, the speaker frame 5 must be lightweight if installed in a vehicle.

A conventional material for the speaker frame is, for example, steel plate or aluminum (die-cast). The steel plate, however, does not have a sufficient freedom in shape (shaping) so that only limited shapes are available for the speaker frame. Further, a specific weight of the steel is large. When the speaker frame is fabricated by the aluminum die-casting, more freedom is obtained in the shaping but a product (speaker frame) becomes very expensive. A specific weight is also large. In recent times, therefore, a thermoplastic synthetic resin is often used in an injection molding process to make a speaker frame. In particular, the injection molding process is frequently utilized with the thermoplastic resin when speaker frames to be installed on vehicles are manufactured because the on-vehicle speaker frames must be lightweight and fabricated in a large quantity. The injection molding is also advantageous since the speaker frame can be fabricated (molded) with other parts at the same time. This reduces a manufacturing cost.

The resin-made frame for the conventional speaker is satisfactory with respect to the "lightweight" and "reduced cost", but the thermoplastic resin cannot provide sufficient mechanical properties such as rigidity and creep resistance. In general, therefore, an inorganic filler (e.g., glass fibers, carbon fibers, talc, mica or whisker) is added to the thermoplastic resin (e.g., ABS, polycarbonate or polypropylene). The thermoplastic resin is a base material.

If the resin frame should be lightweight, the base material resin should have a small specific weight. One example of such resin is an olefin resin. If importance is put on an acoustic property, polypropylene is appropriate because its internal loss is great.

Polypropylene is, however, a crystal resin so that it requires a high concentration of filler (e.g., 40% or more) in order to reduce secondary shrinkage (contraction) and increase rigidity. The secondary shrinkage is shrinkage which occurs after an environmental test.

When the filler is added to the resin in a large concentration and an electroacoustic transducer frame is made from the resin-filler material, a molded product (i.e., frame) becomes heavy since the specific weight increases. In addition, the internal loss decreases so that the frame cannot sufficiently absorb (damp) unnecessary vibrations of the neighboring parts and the speaker itself. Furthermore, fluidity of the molten thermoplastic resin deteriorates so that mass productivity of the resin frames and freedom of the shape of the resin frame are limited.

SUMMARY OF THE INVENTION

An object of the present invention is to provide an electroacoustic transducer frame that does not increase a manufacturing cost, is lightweight, and has a high internal loss, high rigidity and high environmental resistance.

According to one aspect of the present invention, there is provided an electroacoustic transducer frame made from a mixture of a thermoplastic resin and reinforcing fibers dispersed in the thermoplastic resin. The reinforcing fibers include long fibers. The electroacoustic transducer frame may be made by a molding process.

Even if the resin-fiber mixture includes a small amount of filler (reinforcing fibers), the filler can ensure necessary rigidity because a sufficient amount of long fibers are included in the filler. Secondary shrinkage is also prevented. Further, the frame can be lightweight and a decrease of its internal loss can be suppressed. The long fibers twist three dimensionally so that the frame has uniform rigidity. Since shock and energy is dispersed smoothly in the frame, the frame does not easily break upon an external shock. In addition, the frame shows high creep resistance at elevated temperature so that the frame can be used in a high temperature environment. Even in a low temperature environment, the frame has high shock resistance so that the frame can be used at low temperature. A linear expansion coefficient of the frame is close to that of the metal so that the frame does not expand or shrink very much even if the temperature changes. This is advantageous because deformations of the frame would adversely influence vibrating elements of the acoustic transducer. The frame therefore has a good environmental resistance and insures sound quality.

The reinforcing fibers may have an average length sufficient to cause a spring back effect of the reinforcing fibers. The electroacoustic transducer frame may have single-layer portions and three-layer portions. Each of the single-layer portions may consist of a non-foam layer, and each of the three-layer portions may consist of a pair of non-foam layers and a foam layer sandwiched by the pair of non-foam layers.

The average length of the reinforcing fibers may be at least 1 mm. The rigidity of the reinforcing fibers may be greater than rigidity of the thermoplastic resin. The thermoplastic resin may be a crystal thermoplastic resin. The thermoplastic resin may be an olefin resin including polypropylene. An average magnification of expansion upon foaming of the three-layer portion including the pair of non-foam layers may be between about 1.1 and about 5.0 times. At least one of the single-layer portions may have a through hole, in which a screw is received when attaching the electroacoustic transducer frame to an electroacoustic transducer. At least one of the remaining single-layer portions may contact a magnetic circuit of an electroacoustic transducer when the electroacoustic transducer frame is assembled (attached) to the electroacoustic transducer. The electroacoustic transducer frame may have a generally truncated conical shape and include a front peripheral portion, a bottom portion, and a plurality of bridges extending between the front peripheral portion and the bottom portion. The bridges may be connected at some of the single-layer portions.

According to another aspect of the present invention, there is provided a method of manufacturing an electroacoustic transducer frame comprising the steps of: mixing and melting a thermoplastic resin with reinforcing fibers to obtain a molten resin-fiber mixture having the reinforcing fibers dispersed in the thermoplastic resin, the reinforcing fibers having an average length sufficient to achieve a spring back effect of the reinforcing fibers; and injecting and filling the molten resin-fiber mixture into a cavity defined between two mold halves, and retracting at least one portion of one of the two mold halves such that the cavity is partly enlarged at the retracted portion(s), to create an electroacoustic transducer frame having single-layer portions and three-layer portions. Each of the single-layer portions consists of a non-foam layer, and each of the three-layer portions consists of a pair of non-foam layers and a foam layer sandwiched by the pair of non-foam layers.

The retracting movement of the portion(s) of the mold half triggers the spring back effect of the fibers so that the foam structure (three-layer structure) is easily obtained. It is therefore possible to increase the rigidity of the frame without changing the weight of the frame. Since the selected portions of the mold half are only retracted, the foam structures can be formed at those areas of the frame which need rigidity. The single-layer structures (non-foam structures) are formed at other areas of the frame which need toughness. Even if only a small amount of filler (reinforcing fibers) is included in the fiber-resin mixture, the filler can ensure necessary rigidity because the long fibers are sufficiently included in the filler. Further, fluidity of the molten resin-fiber mixture is not deteriorated. Accordingly, it is possible to mold a frame which is thin and/or has a complicated shape.

The average length of the reinforcing fibers may be at least 1 mm. The reinforcing fibers may be included in the resin-fiber mixture at about 5 to 80 weight % (preferably 5 to 30 weight % and more preferably 10 to 30 weight %) and the thermoplastic resin may be included in the resin-fiber mixture at about 20 to 95 weight % (preferably 70 to 95 weight % and more preferably 70 to 90 weight %). The rigidity of the reinforcing fibers may be greater than rigidity of the thermoplastic resin. An average magnification of expansion upon foaming of the three-layer portion including the pair of non-foam layers may be between about 1.1 and about 5.0 times. The thermoplastic resin may be a crystal thermoplastic resin. The thermoplastic resin may be an olefin resin including polypropylene.

DETAILED DESCRIPTION OF THE INVENTION

Embodiments of the present invention will be described in reference to the accompanying drawings.

Figure 1:
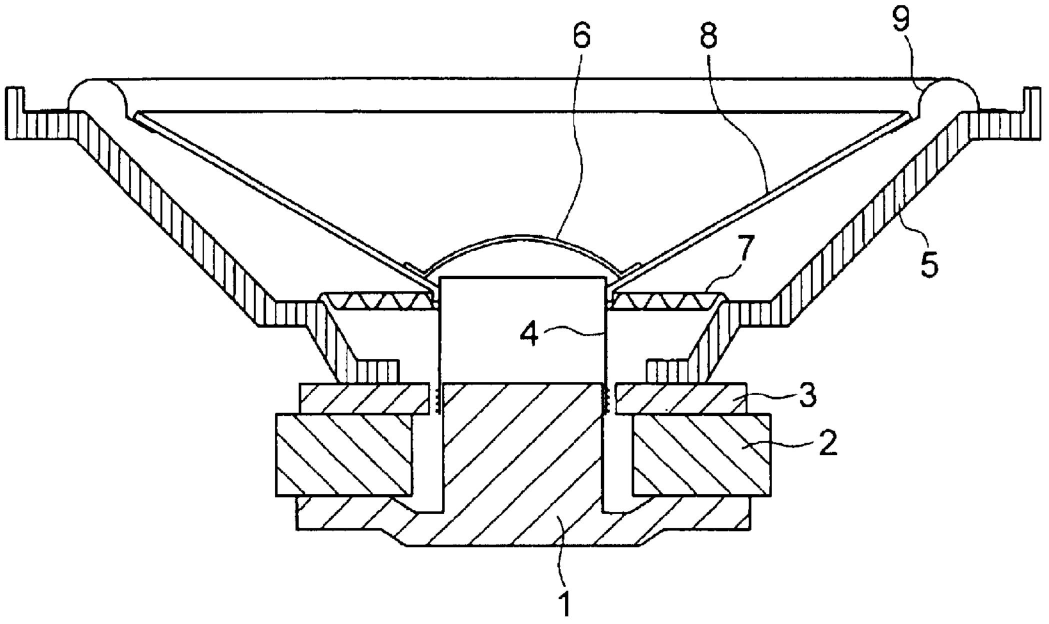
FIG. 1 illustrates a schematic cross sectional view of an electrokinetic speaker.

A speaker frame of a first embodiment is made by an injection molding process without foaming, using a mixture material. The mixture material includes a thermoplastic resin (e.g., polypropylene: PP) and reinforcing fibers (long fibers) dispersed in the thermoplastic resin. The appearance of the speaker frame of this embodiment is similar to that shown in FIG. 1.

The reinforcing fibers has an average fiber length of 1 mm or more, and is included by 5–80 weight % (preferably 5–30 weight % and more preferably 10–30 weight %). Accordingly, the rigidity of the speaker frame is ensured. The thermoplastic resin having high fluidity is included by 20–95 weight % (preferably 70–95 weight % and more preferably 70–90 weight %). Accordingly, the thermoplastic resin can entirely and smoothly fill up a cavity of a metallic mold upon injection. This eliminates bending and/or deformation of the product. If the fibers are included at less than 5 weight %, sufficient expansion, strength, rigidity and thermal resistance cannot be obtained. If the thermoplastic resin is included at more than 80 weight %, fluidity of the molten resin deteriorates, which may result in insufficient expansion and increased bending and deformation.

The average length of the fibers mixed as the filler in the mixture material is preferably 1 mm or more. In this embodiment, the fiber length less than 1 mm is not used. The fibers of 1 mm or more is generally called “long fibers”. If the fiber length is shorter than 1 mm, it is likely that the fibers do not twine or twist satisfactorily. Further, the inadequate fiber twisting is not desirable in view of strength, rigidity and shock resistance. When the fiber length exceeds 15 mm, the fibers do not sometimes disperse in a decent manner and the fluidity of the molten material (resin-fiber mixture) drops. As a result, the resin-fiber mixture does not entirely flow into thin portions or corner areas, and a defective product is made. Use of the reinforcing fibers of 1–15 mm will solve the above-mentioned problems.

Preferably the reinforcing fiber are glass fibers. In general, the following inorganic fibers and organic fibers are satisfactory. Examples of the inorganic fibers are boron fibers, silicon carbide fibers, alumina fibers, silicon nitride fibers, zirconia fibers, glass fibers, carbon fibers, copper fibers, brass fibers, steel fibers, stainless fibers, aluminum fibers and aluminum alloy fibers. Examples of the organic fibers are polyester fibers, polyamide fibers and polyarylate fibers. It should be noted that the organic and inorganic fibers may be mixed. Further, a special treatment may be applied on the fiber surface by a vaporizing process or the like. Alternatively, the fibers may undergo a surface treatment with a coupling agent or the like.

Most preferably, inflexible fibers are used such as aromatic polyester fibers and aromatic polyamide fibers. In this embodiment, the inflexible long fibers are more rigid than the thermoplastic resin.

The glass fibers may be E glass, S glass, C glass, AR glass, T glass, D glass or R glass, all of which are commercially available. The average fiber diameter is 50 microns or less, preferably 3–30 microns. If the glass fiber diameter is smaller than 3 microns, the glass fibers do not intermix with the resin in a desired manner during a pellet preparation process so that resin impregnation becomes difficult. If the glass fiber diameter exceeds 30 microns, on the other hand, breakage often occurs during the mixing process in a molten state. It should be noted that the glass fibers may be surface-treated with the coupling agent when the pellets are prepared from the thermoplastic resin and glass fibers by a drawing process.

Preferably the thermoplastic resin used in the mixture material is polypropylene. For example, it is possible to use olefin resin (e.g., propylene-ethylene block copolymer, propylene-ethylene random copolymer and polyethylene), polystyrene resin (e.g., polystyrene, rubber-modified shock-resistive polystyrene and polystyrene having a syndiotactic structure), ABS resin, polyvinyl chloride resin, polyamide resin, polyester resin, polyacetal resin, polycarbonate resin, polyaromatic ether resin, polyaromatic sulfide resin, polyaromatic ester resin, polysulfone resin, and acrylate resin. It should be noted that the above-mentioned thermoplastic resins can be used individually or mixedly.

Among these thermoplastic resins, it is preferred to utilize polypropylene resin, namely, a block copolymer of polypropylene (or propylene) and other olefin(s), random copolymer of polypropylene (or propylene) and other olefin(s), and mixture of them. It is also preferred that the polypropylene resin includes non-saturated carboxylic acid such as maleic anhydride and fumaric acid, or acid-degenerated polyolefin resin (i.e., resin degenerated with a derivative of the non-saturated carboxylic acid). One or more other thermoplastic resins may be added to the polypropylene resin. Such additional thermoplastic resin is, for example, high density polyethylene, low density polyethylene, ethylene-α-olefin copolymer resin, or polyamide resin. Other substances may also be added to the polypropylene resin. For instance, an elastomer to improve an impact resistance, such as ethylene-α-olefin copolymer elastomer, may be added. An oxidization preventing agent which includes phenol, phosphorus, or sulfur may be added. A light stabilizing agent, ultraviolet ray absorber, environment-proof agent, bridging agent, core making agent, and coloring agent may be added. A filler such as short fibers, talc, and calcium carbonate may be added.

Furthermore, planar, powdery or particulate inorganic compound and whisker (e.g., glass flakes, mica, glass powder (or particles), glass beads, talc, clay, alumina, carbon black and wallastonite) may be used together.

Physical characteristics of products (molded frames) obtained in this embodiment were measured and examined. The long-fiber reinforced resin available from Daicel Chemical Industries Ltd. of Osaka, Japan was used to prepare three products. For each of the three products, the thermoplastic resin of the long-fiber reinforced resin was polypropylene, and the long fibers of the long-fiber reinforced resin were glass fibers. The long fibers were included by 20 weight %, 25 weight % and 30 weight % respectively. A comparison product was also prepared, which included polypropylene and short fibers (glass fibers) dispersed therein. An injection molding machine "Ultra 220" manufactured by Sumitomo Heavy Industries Ltd. of Tokyo, Japan was used.

FIGS. 2, 3, 4 and 5 show measurement results of dimension change (secondary shrinkage), internal loss-specific weight (acoustic characteristics), bending elasticity (temperature dependency) and Isod impact strength (temperature dependency) respectively.

Figure 2:
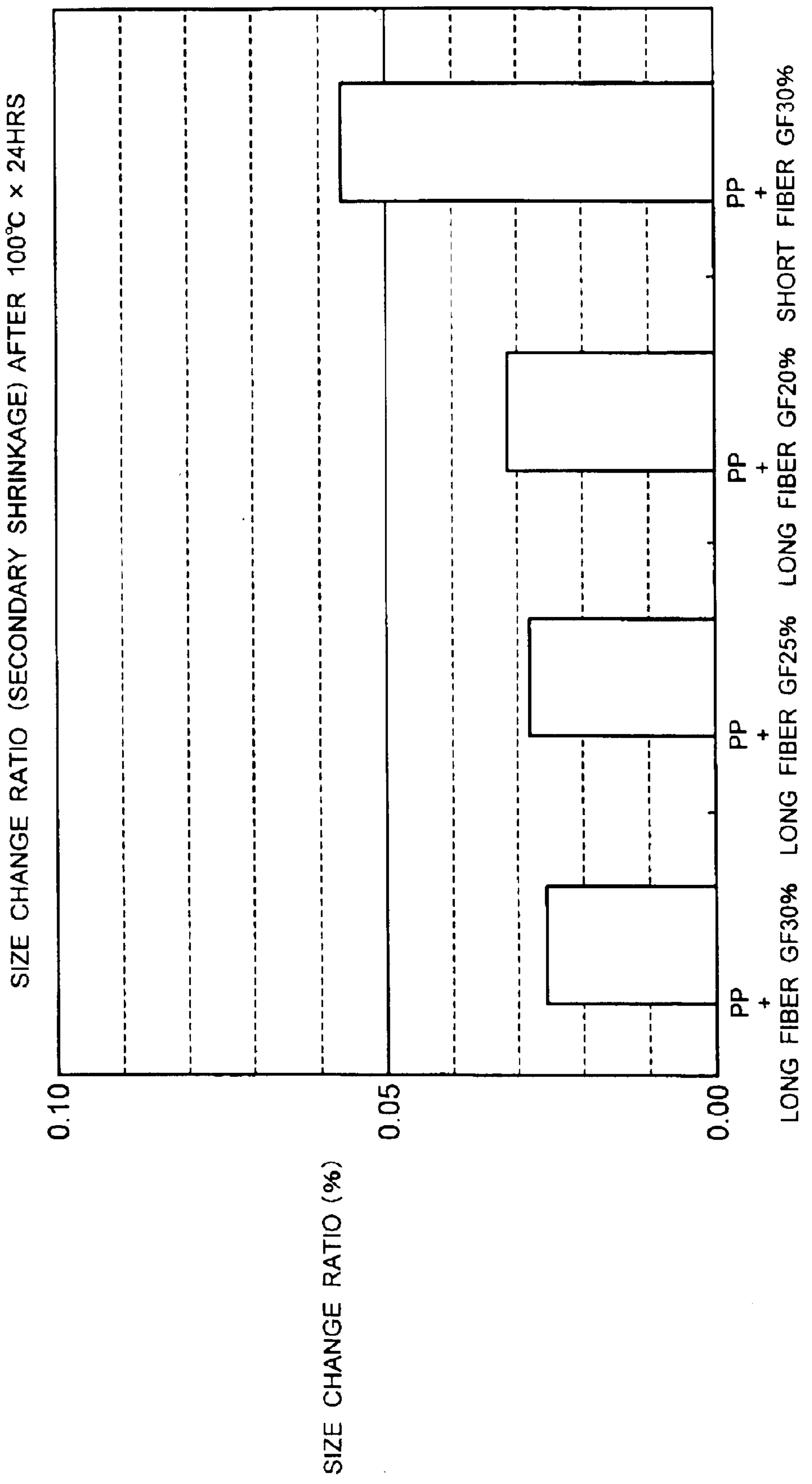
FIG. 2 is a graph showing a size change ratio of four specimens (speaker frames)
Figure 3:
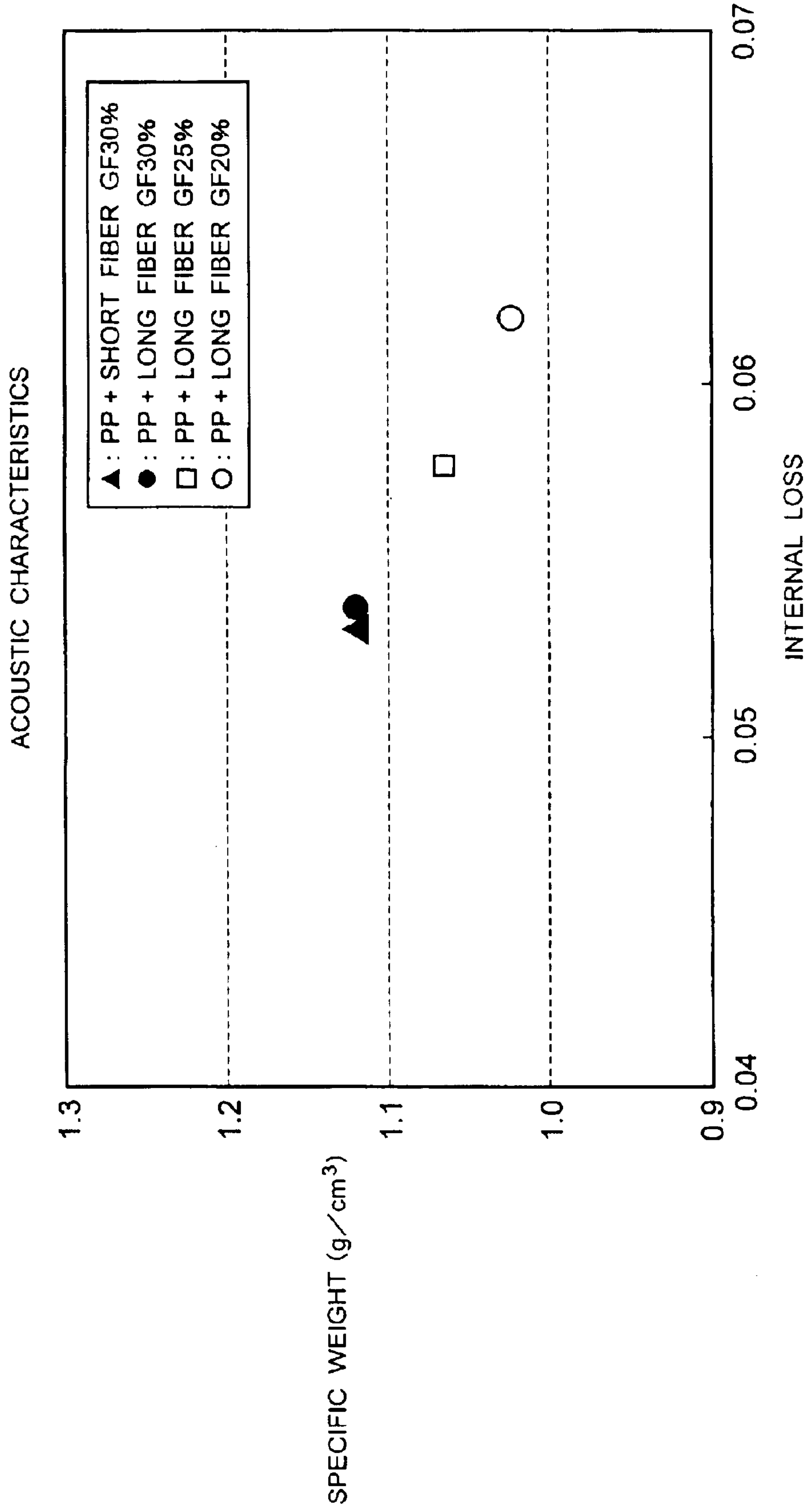
FIG. 3 is a graph showing relationship between a specific weight and internal loss of the four specimens.
Figure 4:
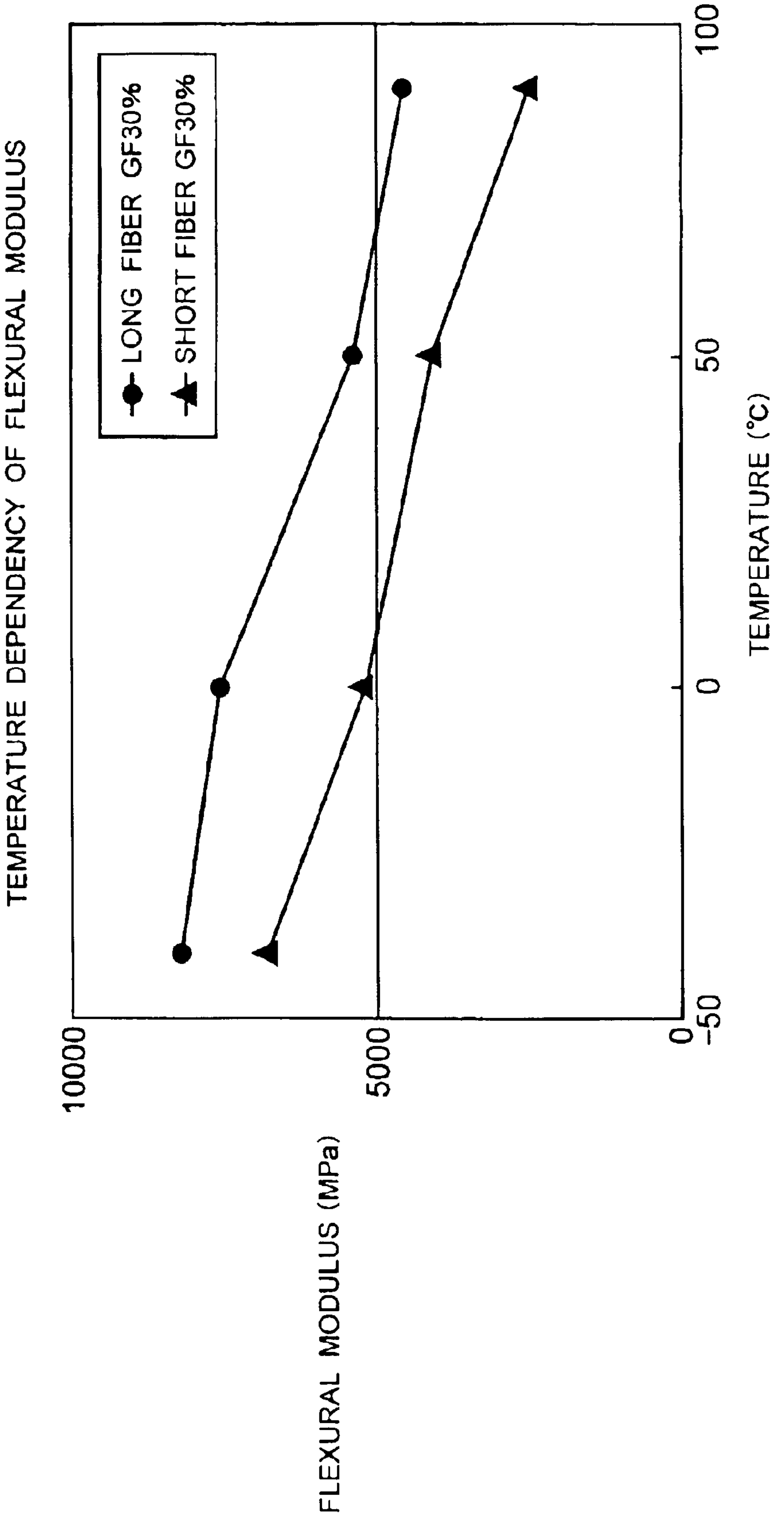
FIG. 4 is a graph showing relationship between flexural modulus and temperature of the two specimens.
Figure 5:
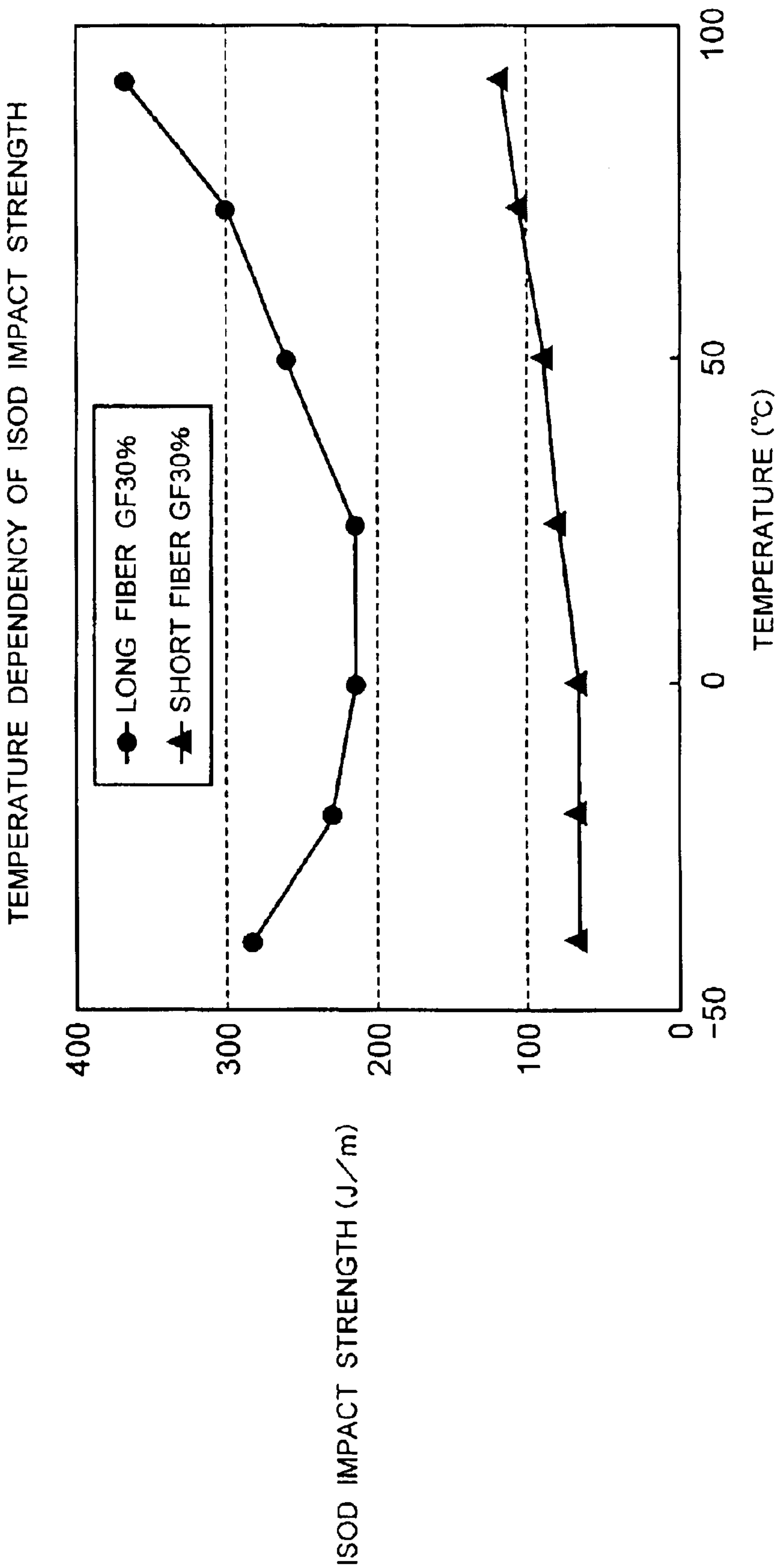
FIG. 5 illustrates relationship between Isod impact strength and temperature of the two specimens.

Referring to FIG. 2, it was confirmed that a small amount of filler is sufficient to ensure necessary-rigidity and prevent the secondary shrinkage (contraction). This contributes to weight reduction. FIGS. 3 and 4 also revealed that a small quantity of filler can ensure required rigidity and suppress the internal loss decrease. FIG. 5 indicates that the long fibers twist each other three-dimensionally and the product has uniform rigidity. As a result, energy (e.g., shock and vibration) propagation inside the product is improved. The product, therefore, does not break easily when the product is shocked and/or shook.

Now, a second embodiment of the present invention will be described.

Figure 6:
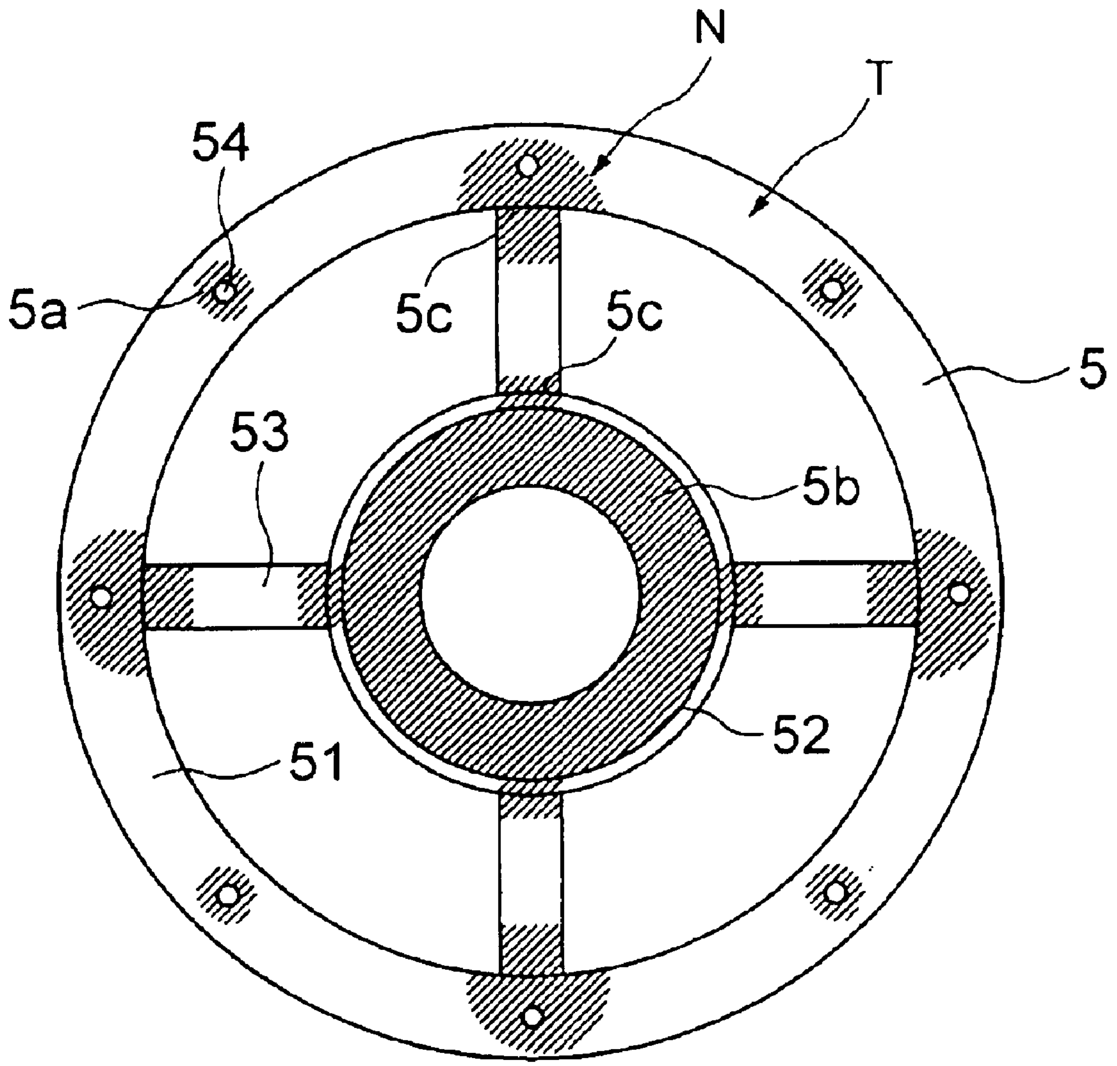
FIG. 6 illustrates a front view of a speaker frame according to a second embodiment of the present invention.

Referring to FIG. 6, a speaker frame 5 fabricated by an injection foam molding process is illustrated. This speaker frame 5 includes a front peripheral edge 51 to support an edge of a cone-shaped diaphragm and a bottom portion 52 to support a magnetic circuit. A plurality of bridges 53 extend between the front peripheral edge 51 and the bottom portion 52. The bottom portion 52 includes a surface to which a damper is attached. The front peripheral edge 51 of the speaker frame is secured to a baffle or cabinet. The front peripheral edge 51 has a plurality of through holes 54, into which screws are threaded (or received) to secure the speaker frame 5 to the baffle/cabinet.

Figure 7:
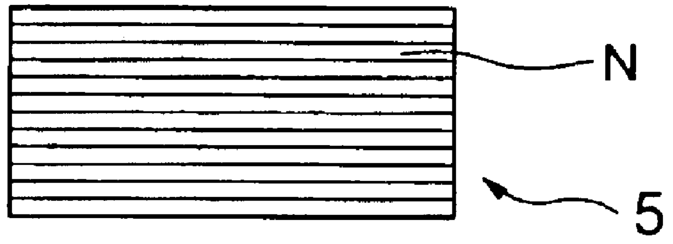
FIG. 7 illustrates a schematic cross sectional view of a non-foam portion (single-layer portion) of the speaker frame shown in FIG. 6.
Figure 8:
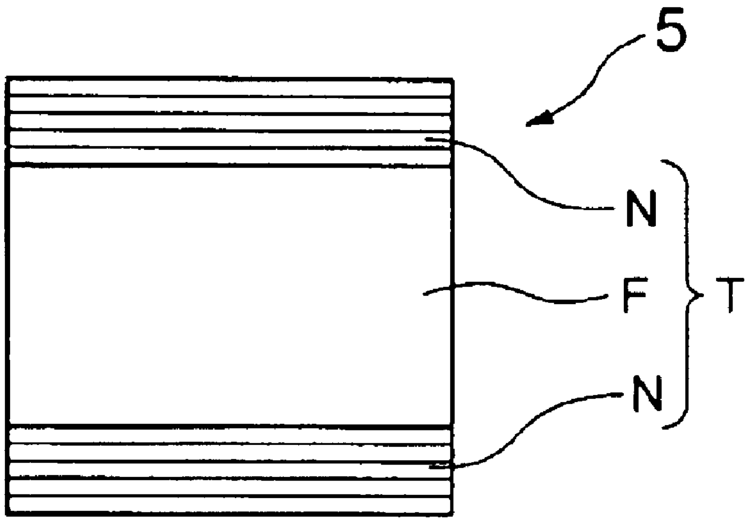
FIG. 8 illustrates a schematic cross sectional view of a three-layer portion of the speaker frame shown in FIG. 6.

The speaker frame 5 is injection-foam molded using a mixture of a thermoplastic resin (e.g., polypropylene) and reinforcing fibers. The reinforcing fibers have an enough average length such that the reinforcing fibers are dispersed in the thermoplastic resin and cause a spring back effect. The speaker frame 5 has single-layer portions N (FIG. 7) and three-layer portions T (FIG. 8). The single-layer portion is a non-foam layer N. The three-layer portion T includes two non-foam layers N and a foam layer F sandwiched by the non-foam layers. Thin areas of the speaker frame 5 are made by the non-foam layer N. The speaker frame 5 is thin in the following areas; areas 5*a* in the frame front portion 51 around the screw holes 54, an area 5*b* in the bottom portion 52 to which the magnetic circuit is fixed, and areas 5*c* at which the bridges 53 are connected to the frame front portion 51 and bottom portion 52. Therefore, the speaker frame 5 partly has the single-layer structures (non-foam layers) N and the three-layer structures (non-foam, foam and non-foam layers) T. Since the three-layer structure has a greater strength but is brittle, those portions of the speaker frame 5 which are subject to stresses due to vibrations are preferably made of the single-layer structure N. It should be noted, however, that the three-layer structure T shown in FIG. 8 may also be used if reinforcing ribs or the like are attached to the surfaces of the three-layer structure T.

The three-layer structure T is made by the following process. The thermoplastic resin and reinforcing fibers are mixed, melt and injected into a cavity of a metallic mold. Immediately after the injection, a mold half is retracted to cause the foaming. As a result, the inside material foams and creates the foam layer F. The outside material is in contact with the inner wall of the mold (cavity wall) so that the outside material solidifies before the foaming. The solidified skin layers become the non-foam layers N. The foaming mainly depends upon the spring back effect during the molding process. The spring back effect is a phenomenon which occurs when the binding force of the thermoplastic resin to the reinforcing fibers is weakened upon heating to (or over) the softening point or melting point of the material. The residual stress of the reinforcing fibers as deformed is released if the binding between the thermoplastic resin and the reinforcing fibers is weakened. Thus, the reinforcing fibers return to the original shape and form gas space around the reinforcing fibers. This results in expansion of the material, and the expansion is called "spring back effect".

In this embodiment, the material (mixture of the thermoplastic resin and reinforcing fibers) fills up the mold cavity, and the mold half is moved away from the other mold half such that non-foam layers (skin layers) having a desired thickness are created and an appropriate foam layer (inner layer) is created between the non-foam layers by the partial foaming.

The mold half is moved away from the mating mold half until the enlarged mold cavity becomes equal to the volume of the product. Since the material expands due to the spring back effect, the product (speaker frame) is lightweight relative to its volume. The reinforcing fibers have the average length of 1 mm or more and is included in the material by 5–80 weight % (preferably 5–30 weight % and more preferably 10–30 weight %). Therefore, the speaker frame has sufficient rigidity. Further, since the thermoplastic resin having high fluidity is included in the material by 20–95 weight %, the thermoplastic resin injected into the metallic mold can flow to the cavity entirely and smoothly. This prevents the bending (camber) and deformation of the product. If the fibers are included at less than 5 weight %, the expansion, strength, rigidity and thermal resistance are often insufficient. If the fibers are included at more than 80 weight %, the fluidity of the molten material drops so that the unexpected expansion and shape often result.

Preferably the average length of the fibers mixed, as the filler, with the thermoplastic resin is 1 mm or longer. The fibers of 1 mm or more are referred to as "long fibers". If the fiber length is shorter than 1 mm, it is likely that the fibers do not twine or twist satisfactorily. This results in insufficient foaming. Further, the inadequate fiber twisting is not desirable in view of strength, rigidity and shock resistance. When the fiber length exceeds 15 mm, the fibers sometimes disperse insufficiently and the fluidity of the molten material drops. As a result, the material does not entirely flow into thin (narrow) portions or corner areas of the cavity, and in turn a defective product is made. Use of the reinforcing fibers of 1–15 mm will solve the above-mentioned problems.

The same long fibers and thermoplastic resin are used in this embodiment as the first embodiment.

Physical characteristics of molded products in this embodiment were measured and examined. The long fibers (reinforcing fiber) available from Daicel Chemical Industries, Ltd. were included in the resin-fiber mixture by 30 weight %. The injection molding machine "Ultra 220" of Sumitomo Heavy Industries Ltd. was employed.

The products were molded such that the products had the same weight, but different foaming ratios (expansion magnification upon foaming). Specific weight, Young's modulus, internal loss, product thickness and rigidity were measured.

It was confirmed that the Young's modulus drops, the specific weight decreases and the product becomes thicker when the foaming ratio rises. The rigidity is proportional to the Young's modulus and also to the cube of the product thickness. It was therefore revealed that the rigidity increases as the foaming ratio increases, and the internal loss increases as the foaming ratio increases.

When the foaming ratio (magnification) was about 1.1, a product having a foaming layer showed approximately the same rigidity as a product having no foaming layer. Further, the product having the foaming layer had more internal loss. If the foaming ratio was increased, the product became more rigid. On the other hand, if the foaming ratio was smaller than about 1.1, the weight reduction of the product was not expected very much.

If the foaming ratio exceeds about 5.0, the foam cells become too large and a different foam structure is created in every manufacturing process. Since the speaker frames are made in a large quantity, the speaker frames should have uniform physical characteristics (foam structure). Accordingly, the foaming ratio is preferably between about 1.1 and about 5.0.

When the foaming ratio is more than 1.5, the foam cells in the inner foam layer F are directed (arranged, aligned, elongated) in a longitudinal direction relative to the layer thickness direction. This reinforces the surface non-foam layers N. As a result, the drop of the Young's modulus becomes gentle, and the rigidity increases steeply. This is partly relied upon a fact that the mold half is retracted at a high speed when effecting the foaming.

On the other hand, when the foaming ratio is greater than 2.5, the resin density of the inner foam layer F which reinforces the outer foam layers N becomes too small. Accordingly, the drop of the Young's modulus becomes significant, the shock resistance of the product is deteriorated, and the irregularities in rigidity of the products become larger. In order to efficiently increase the structural rigidity with the foam structure and obtain the products having uniform qualities, the preferred range of the foaming expansion ratio is between about 1.5 and 2.5.

In order to obtain the lightweight and highly rigid three-layer structure, which includes the inner foam layer F and the sandwiching non-foam layers N, it is desired to make the three-layer structure as thin as possible, while ensuring the intensity of the surface non-foam layers N. However, when the three-layer structure having thin surface layers N is fabricated by the injection foam molding, the surface layers N sometimes deform and/or crack upon foaming when the mold half is retracted. In short, if the surface layer N is too thin, the three-layer structure cannot have sufficient strength.

On the other hand, when the surface layers N are too thick, an amount of the resin used to form the inner layer F becomes insufficient. Therefore, desirable foaming expansion cannot be expected, i.e., the foaming expansion ratio drops. In view of these facts, the most preferred thickness of the surface non-foam layer N in the three-layer structure is about one-third the material thickness of before the foaming.

As described above, the mixture of the resin and the long fibers is injection molded to create the three-layer structure T in some portions of the product (speaker frame) 5 in this embodiment. Therefore, the speaker frame 5 can have a low specific weight and large thickness. The speaker frame 5 is lightweight and highly rigid. In addition, since the opposite surfaces of the speaker frame 5 are the non-foam layers N, the speaker frame 5 has an adequate environmental resistance. Moreover, the speaker frame 5 can be fabricated inexpensively.

Figure 9:
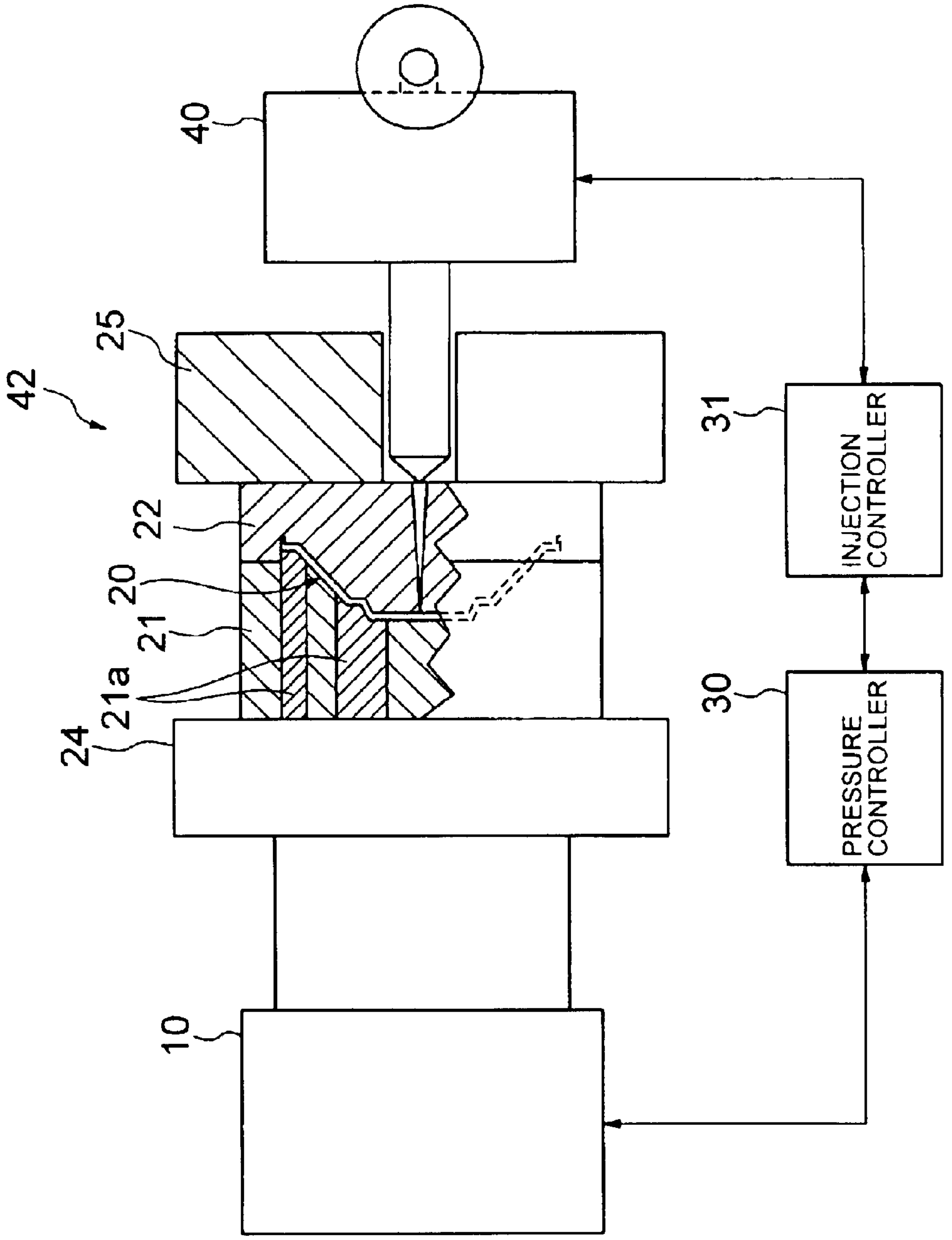
FIG. 9 schematically illustrates an injection molding machine, partly in cross section, to carry out a speaker frame manufacturing method according to an embodiment of the present invention.

Referring to FIG. 9, an injection foam molding machine 42 for fabricating the speaker frame 5 is illustrated. The injection molding machine 42 includes a stationary mold half 22 and a movable mold half 21, which can move back and forth relative to the stationary mold half 22. A cavity 20 is defined between the mold halves 21 and 22. The cavity 20 has a shape corresponding to the product. The movable mold half 21 is moved back and forth to increase and decrease the volume of the cavity 20. Some portions of the mold half 21 are only retracted such that the three-layer structures T (FIG. 8) are formed in the desired portions of the speaker frame 5. Movements of the mold half 21 may be effected by a suitable mechanism such as a direct-pressure type mold closing/opening mechanism, or a mold displacement device which is independent of the injection molding machine. The independent mold displacement device may be located between the movable mold half 21 and a movable platen 24 or inside the movable mold half 21 such that slidable elements of the mold half 21 are moved back and forth. The movable mold half 21 is supported by a movable platen 24 and the stationary mold half 22 is supported by a stationary platen 25. A compressing or closing pressure between the mold halves 21 and 22 is controlled by a cylinder 10 regulated by a controller 30.

The fixed mold half 22 has a sprue which receives a nozzle of an injection unit 40 to inject the material (mixture of the molten thermoplastic resin and long fibers). The injection unit 40 is operated in accordance with conditions controlled by an injection process controller 31, and the material is injected into the cavity 20 from the sprue. Molding process information is sent to the injection process controller 31 from the injection unit 40. The mold closing pressure is controlled by the controller 30, which is connected to the injection process controller 31, on the basis of the molding process information and other information including the location and movement of the movable platen 24. Although not illustrated in FIG. 9, one or more devices for controlling the temperature of the inner walls of the mold halves 21 and 22 (i.e., the temperature of the cavity wall) are provided in the movable mold half 21 and/or the fixed mold half 22 and connected to the mold closing pressure controller 30.

Now, a speaker frame manufacturing method using the molding machine shown in FIG. 9 will be described.

Figure 10A:
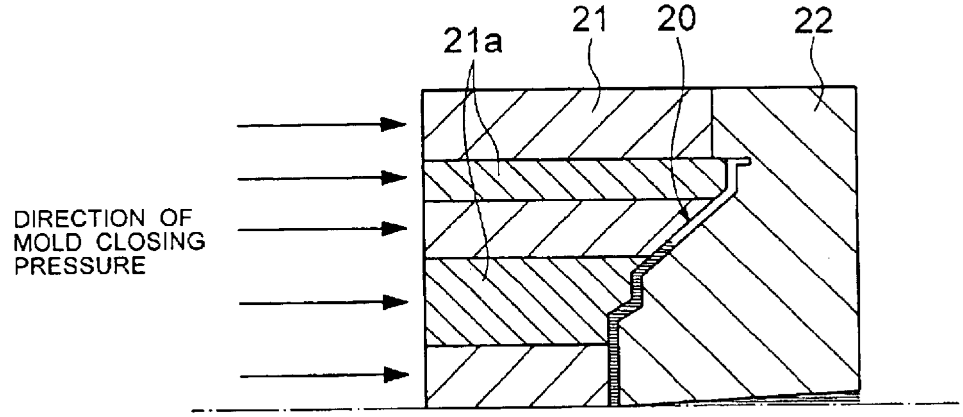
FIGS. 10A through 10C illustrate a series of operations of the speaker frame manufacturing method in a chronological order.

Referring to FIG. 10A, the mold closing cylinder 10 moves the movable mold half 21 (forwards) towards the stationary mold half 22 until the cavity 20 defined between the two mold halves 21 and 22 has an initial shape (first predetermined thickness). The injection machine 40 then injects the resin-fiber mixture into the cavity 20.

The temperature of the resin-fiber mixture in the cylinder 10 is maintained to about 230° C. The wall temperature of the cavity 20 is maintained to approximately 90° C. The mold closing (tightening) pressure exerted by the cylinder 10 under the control of the tightening pressure controller 30 is maintained to approximately 100 tons. In general, the molten resin-fiber mixture as injected is compressed between the mold halves 21 and 22 upon the forward movement (closing movement) of the movable mold half 21 before the injection of the resin-fiber mixture is complete. The resin-fiber mixture fills up the cavity 20. The movable mold half 21 is moved forwards until the cavity 20 has the first predetermined thickness, as mentioned earlier. The first predetermined thickness of the cavity 20 is about =b 1 =l mm in this embodiment. The movement of the mold half 21 is effected by the position control or the pressure control.

Figure 10B:
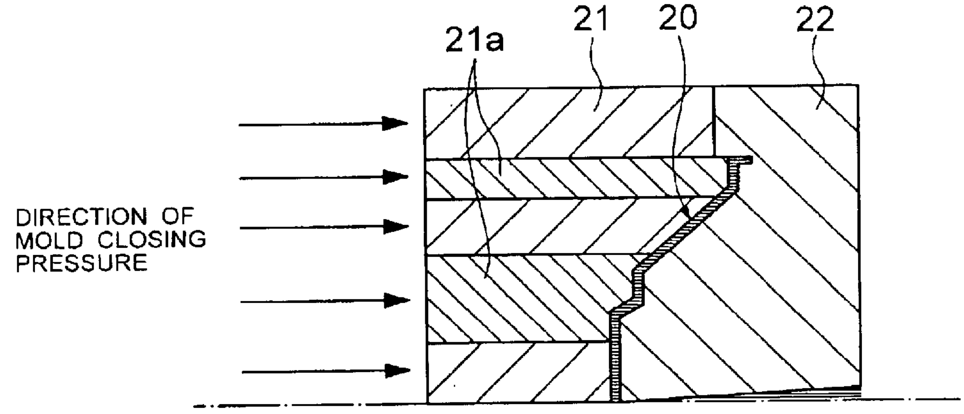

Referring to FIG. 10B, the resin-fiber mixture filled in the cavity 20 between the movable mold half 21 and fixed mold half 22 starts solidifying from those portions which contact the inner walls of the mold halves 21 and 22 (i.e., cavity wall), thereby forming the non-foam surface layers N.

Figure 10C:
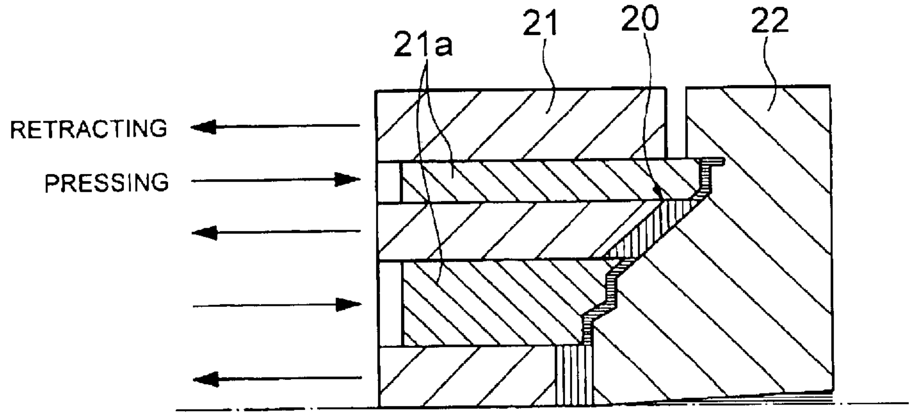

Then, as shown in FIG. 10C, the pressure exerted by the cylinder 10 is reduced to almost 0 ton immediately after the completion of the filling up of the resin-fiber mixture. At this point, the long fibers in the resin-fiber mixture in the molten state are still able to push the non-foam surface layers (solidified layers) N outwards. Subsequently, the movable mold half 21, without some portions 21*a*, is moved backwards (retracted) until the cavity 20 has a second predetermined thickness. The portions 21*a* remain at the first predetermined thickness position. The second predetermined thickness is about 1.1–5.0 times the first predetermined thickness. Upon this retracting movement of the movable mold half 21, the molten portion (inside portion) of the resin-fiber mixture expands due to the spring back effect of the twisted fibers of the resin-fiber mixture and the resin-fiber mixture becomes a final shape. The expanding force imposes the resin-fiber mixture against the cavity wall. In this embodiment, the resin-fiber mixture injected into the cavity 20 has to be in the molten state and have high expandability. Preferably, the average length of the fibers in the resin-fiber mixture is long.

Now, the timing of opening the mold, i.e., when the movable mold half 21 should be retracted from the fixed mold 22, will be described. If the movable mold 21 is retracted before the rein-fiber material injection is complete, the resin-fiber material is excessively concentrated (i.e., too many resin-fiber material is introduced) in the cavity 20 between the mold halves 21 and 22, and therefore the weight of the product becomes too heavy. On the other hand, if the retraction movement of the movable mold half 21 takes place too late, the resin-fiber material is solidified excessively and the solidification is complete before the foaming sufficiently occurs. In this embodiment, therefore, the movable mold half 21 is preferably retracted immediately after the completion of the material injection. It should be noted, however, that the timing for retracting the movable mold 21 should be determined on the basis of the temperature of the resin-fiber material, the temperature of the mold, the thickness of the product, an amount of the long fibers included in the resin-fiber material and/or other factors.

An amount of the retracting movement of the movable mold 21 is about 0.1 to 1.5 mm. This retracting movement should be performed within a period of 0.04 to 0.05 second (high speed retracting movement) when a non-thin speaker frame is fabricated. Therefore, the long fibers, spring force (if a spring is provided between the molds 21 and 22) and closing pressure are controlled such that the movable mold 21 moves at a speed of about 0.0020 to 0.0375 mm/ms. When a thin speaker frame is fabricated, on the other hand, the movable mold 21 is retracted at a speed of about 0.001 mm/ms or more.

It should be noted that the foaming ratio may be increased by locating a spring located between the movable mold 21 and fixed mold 22. The spring increases a mold opening force (i.e., facilitates the retracting movement of the mold 21) upon releasing (dropping) of the mold closing pressure. Alternatively, the foaming ratio may be increased by employing an injection molding machine 42 that can force the platen 24 backwards (to the left in FIG. 9) immediately after the completion of the material injection.

Unlike the weight reduction relying upon a common foaming agent, the speaker frame of this embodiment has a reduced weight due to the restoration (expansion) of the twisted fibers of the thermoplastic resin-fiber material. The speaker frame of this embodiment, therefore, has continuous airspace along the fibers and uniform expanded portion.

The molding machine shown in FIG. 9 can be used for both the first and second embodiments. The portions 21*a* are actuated together with the other portions of the movable mold 21 in the first embodiment.

This application is based on Japanese patent application No. 2001-221194, and the entire disclosure thereof is incorporated herein by reference.

What is claimed is:

1. A molded frame for an electroacoustic transducer, the molded frame comprising a mixture of a thermoplastic resin and reinforcing fibers dispersed in the thermoplastic resin, the reinforcing fibers including long fibers, wherein an average length of the reinforcing fibers is at least 1 mm.

2. The molded frame according to claim 1, wherein rigidity of the reinforcing fibers is greater than rigidity of the thermoplastic resin.

3. The molded frame according to claim 1, wherein the thermoplastic resin is a crystal thermoplastic resin.

4. The molded frame according to claim 1, wherein the thermoplastic resin is an olefin resin including polypropylene.

5. A frame for an electroacoustic transducer, the frame comprising a mixture of a thermoplastic resin and reinforcing fibers dispersed in the thermoplastic resin, the reinforcing fibers including long fibers having an average length sufficient to achieve a spring back effect of the reinforcing fibers, the frame having single-layer portions and three-layer portions, each of the single-layer portions consisting of a non-foam layer, and each of the three-layer portions consisting of a pair of non-foam layers and a foam layer sandwiched by the pair of non-foam layers.

6. The frame according to claim 5, wherein the average length of the reinforcing fibers is at least 1 mm.

7. The frame according to claim 5, wherein rigidity of the reinforcing fibers is greater than rigidity of the thermoplastic resin.

8. The frame according to claim 5, thermoplastic resin is a crystal thermoplastic resin.

9. The frame according to claim 5, wherein the thermoplastic resin is an olefin resin including polypropylene.

10. The frame according to claim 5, wherein an average magnification of expansion upon foaming of the three-layer portion including the pair of non-foam layers is between about 1.1 and about 5.0 times.

11. The frame according to claim 5, wherein at least one of the single-layer portions has a through hole, in which a screw is received to permit attachment of the frame to an electroacoustic transducer.

12. The frame according to claim 5, wherein the electroacoustic transducer has a magnetic circuit in contact with at least one of the single-layer portions when the frame is attached to the electroacoustic transducer.

13. The frame according to claim 5, wherein the frame has a generally truncated conical shape and includes a front peripheral portion, a bottom portion and a plurality of bridges, and the plurality of bridges connect the front peripheral portion with the bottom portion at a plurality of the single-layer portions.

14. A method of manufacturing an electroacoustic transducer frame comprising the steps of:

A) mixing and melting a thermoplastic resin with reinforcing fibers to obtain a molten resin-fiber mixture including the reinforcing fibers dispersed in the thermoplastic resin, the reinforcing fibers having an average length sufficient to achieve a spring back effect of the reinforcing fibers; and B) injecting and filling the molten resin-fiber mixture into a cavity defined between two mold halves, and retracting at least one portion of the two mold halves such that the cavity is partly enlarged, to create an electroacoustic transducer frame having single-layer portions and three-layer portions, each of the single-layer portions consisting of a non-foam layer, and each of the three-layer portions consisting of a pair of non-foam layers and a foam layer sandwiched by the pair of non-foam layers.

15. The method according to claim 14, wherein the average length of the reinforcing fibers is at least 1 mm, and the reinforcing fibers are included in the resin-fiber mixture at about 5 to 80 weight % and the thermoplastic rein is included in the resin-fiber mixture at about 20 to 95 weight %.

16. The method according to claim 14, wherein rigidity of the reinforcing fibers is greater than rigidity of the thermoplastic resin.

17. The method according to claim 14, wherein an average magnification of expansion upon foaming of the three-layer portion including the pair of non-foam layers is between about 1.1 and about 5.0 times.

18. The method according to claim 14, wherein the thermoplastic resin is a crystal thermoplastic resin.

19. The method according to claim 14, wherein the thermoplastic resin is an olefin resin including polypropylene.

20. The molded frame according to claim 1, wherein the reinforcing fibers are included by 10–30% weight.

* * * * *

UNITED STATES PATENT AND TRADEMARK OFFICE

CERTIFICATE OF CORRECTION

PATENT NO. : 6,871,724 B2
DATED : March 29, 2005
INVENTOR(S) : Satoshi Hachiya et al.

It is certified that error appears in the above-identified patent and that said Letters Patent is hereby corrected as shown below:

Column 11,
Lines 30-31, “polypropyene” should read -- polypropylene --.
Line 47, after “claim 5,” and before “thermoplastic”, insert -- wherein the --.

Column 12,
Line 36, “rein” should read -- resin --.

Signed and Sealed this

Seventh Day of February, 2006

JON W. DUDAS
*Director of the United States Patent and Trademark Office*